US007530590B2

(12) United States Patent
Staggs (10) Patent No.: US 7,530,590 B2
(45) Date of Patent: May 12, 2009

(54) HITCH LOCKING AND ALARM MECHANISM

(76) Inventor: Arnol Staggs, 1155 Lincoln, Wyandotte, MI (US) 48192

( * ) Notice: Subject to any disclaimer, the term of this patent is extended or adjusted under 35 U.S.C. 154(b) by 304 days.

(21) Appl. No.: 11/441,597

(22) Filed: May 26, 2006

(65) Prior Publication Data

US 2006/0214392 A1 Sep. 28, 2006

(51) Int. Cl.
*B60D 1/60* (2006.01)
(52) U.S. Cl. .................. 280/507; 280/491.5; 340/431
(58) Field of Classification Search ............ 280/507, 280/511, 512, 514, 504, 491.5; 70/34, 208, 70/209, DIG. 49; 340/431, 425.5
See application file for complete search history.

(56) References Cited

U.S. PATENT DOCUMENTS

| 5,598,725 | A | * | 2/1997 | Chang ..................... 70/209 |
| 6,092,846 | A | * | 7/2000 | Fuss et al. ................ 292/302 |
| 6,543,260 | B2 | * | 4/2003 | Koy et al. .................. 70/34 |
| 6,820,890 | B2 | * | 11/2004 | Westerdale .............. 280/507 |

* cited by examiner

*Primary Examiner*—Tony H. Winner
(74) *Attorney, Agent, or Firm*—Gerald R. Black

(57) ABSTRACT

The hitch locking and alarm mechanism comprises a hitch member for attachment to the towing vehicle, a tow vehicle mount for attachment to the towed vehicle, a locking pin, and a locking pin housing assembly with an alarm. A drawbar of the hitch member is insertable into a receiver tube of a tow vehicle mount secured to the undersurface of the towed vehicle. The drawbar and the receiver tube each have cross bores that are alignable with each other. The hitch member has a drawbar, and the drawbar has a cross bore. The tow vehicle mount comprises a receiver tube secured to a vehicle guide plate. The hitch member is engageable within a receiver tube positioned within the tow vehicle mount. A locking pin is insertable through the two cross bores, and the end of the locking pin connects with the locking pin housing assembly. The alarm switch is mounted within the locking pin housing assembly. The end portion of the locking pin activates the alarm when the locking pin is inserted into the locking pin housing assembly such that the alarm moves into the armed status. Any unauthorized removing or repositioning of the locking pin within the locking pin housing assembly causes the alarm to move into the alarm status. The hitch alarm detects any unauthorized removal of either the hitch member or the towed vehicle from the towing vehicle. The hitch alarm is substantially hidden from view when the hitch member is secured to the tow vehicle mount.

9 Claims, 8 Drawing Sheets

Locking Pin Housing Assembly - Section
Armed Status

FIGURE 1A
Hitch Assembly

Detail A
End Cover

FIGURE 1B
Hitch Assembly

FIGURE 2A
Tow Vehicle Mount

FIGURE 2B
Tow Vehicle Mount
Section A-A

FIGURE 3
Locking Pin Housing Assembly

FIGURE 4A
Locking Pin Housing Assembly - Section
Armed Status

FIGURE 4B
Locking Pin Housing Assembly - Section
Alarm Status

FIGURE 4C
Locking Pin Housing Assembly
Armed Status

FIGURE 5A
Locking Pin Housing Assembly - Section
Armed Status

FIGURE 5B
Locking Pin Housing Assembly - Section
Alarm Status

FIGURE 5C
Locking Pin Housing Assembly
Armed Status though the receiving tube. The tow vehicle mount is secured
HITCH LOCKING AND ALARM MECHANISM This patent application claims the benefit under 35 USC §112 to the filing date of co-pending U.S. patent application Ser. No. 11/076,270 entitled "Hitch Locking Mechanism", filed on Mar. 10, 2005; U.S. patent application Ser. No. 10/387,233 entitled "Hitch Locking Mechanism," filed on Mar. 13, 2004, now U.S. Pat. No. 6,889,995; U.S. patent application Ser. No. 10/372,507, entitled "Hitch Locking Mechanism" filed on Feb. 24, 2003 (now abandoned); and U.S. Provisional Application No. 60/419,070, entitled "Hitch Locking Mechanism" filed on Oct. 17, 2002.

FIELD OF USE

The present invention relates to a hitch locking and alarm mechanism, and more particularly, to a unique anti-theft mechanism that is adaptable to many different hitch locking applications.

BACKGROUND OF THE INVENTION

One shortcoming of many of the conventional locking mechanisms is that they rely on an exposed padlock that can be cut quickly and easily by thieves using bolt cutters. One sharp blow with a hammer and chisel can also pop many padlocks open. All of such locking mechanisms are relatively easy to pry off of or out of the protected ball or socket component.

With the increase in towed leisure vehicles, many people go to the trouble and expense to have sturdy chains anchored in the ground and secure the chains to their towed vehicles by padlocks, only to discover that a thief can readily cut a padlock or chain of such an arrangement by using heavy-duty bolt-cutters, a hacksaw or other tool.

U.S. Pat. No. 4,230,316 discloses an anti-theft ball for use with ball and socket hitches an externally threaded mounting bolt that engages an internally threaded central opening in the ball. A smaller diameter-locking bolt extends downwardly through a smaller diameter opening in the top of the ball and engages an internally threaded opening in the upper end of the mounting bolt. The threads on the mounting bolt have a different pitch than the threads on the locking bolt. The socket of the hitch prevents access to the locking bolt and the different pitches prevent the mounting bolt from being disengaged. Also, U.S. Pat. No. 5,087,064 discloses an anti-Theft and Safety Device for a Ball and Socket Trailer Hitch. The apparatus prevents the socket of such a hitch from being disconnected from the ball inadvertently or without the owners' permission. But nothing was provided to protect the ball.

Accordingly, there is a need for a durable, inexpensive, simply operated, and effective trailer hitch lock for trailers with the locking devices to prevent its undesirable removal from a coupler. There is a need for an improved type of inexpensive and effective trailer hitch that is easy to assemble and install, that can safely accommodate different size vehicles and loads, that is compatible with various hitch designs, and that provides improved wear.

What is needed is an improved trailer hitch locking mechanism and alarm that is tamper-resistant to discourage theft of the towed vehicle or the hitch, that has relatively few moving components, that is easy to assemble and install, yet leaves no exposed parts that thieves can quickly and easily cut, turn or pry on to open the lock. Another objective of this invention is the provision of an improved locking mechanism for a trailer hitch security lock.

SUMMARY OF THE INVENTION

The hitch locking and alarm mechanism of the present invention addresses these needs.

The hitch locking and alarm mechanism of the present invention is for use with a trailer hitch assembly. The trailer hitch assembly comprises a hitch member for attachment to the towing vehicle, and a tow vehicle mount for attachment to the towed vehicle. The hitch locking and alarm mechanism comprises a locking pin, and a locking pin housing assembly with a hitch alarm.

In the preferred embodiment of the hitch locking and alarm mechanism of the present invention, the hitch member comprises a shank assembly (for attachment to the towing vehicle), a drop ball mount, and a drawbar. The drop ball mount includes an opening extending therethrough for the shank assembly. The drawbar is secured to the undersurface of the drop ball mount. One end of the drawbar is secured to the drop ball mount, and a second end of the drawbar is closed. Such closure preferably comprises an end cover secured to the second section of the drawbar by a drawbar end cover and enables cooperative engagement with the hitch alarm, as set forth below. A cross bore extends through the drawbar.

In the preferred embodiment of the hitch locking and alarm mechanism of the present invention, the tow vehicle mount comprises a receiver tube secured to a vehicle guide plate. The drawbar is inserted into and through the receiving tube. Additional strength between the receiver tube and guide plate is provided by a pair of receiver braces. A cross bore extends through the receiving tube. The tow vehicle mount is secured to the undersurface of the towed vehicle.

In a first preferred embodiment of the hitch locking and alarm mechanism of the present invention, a locking pin and locking pin housing assembly are alignable with each other through the cross bores in the receiver tube and the cross bores of the drawbar, once the drawbar has been positioned into the receiving tube. The end of the locking pin is machined so as to be securely retained within the jaws of the locking pin housing assembly.

An alarm switch is mounted in the locking pin housing assembly. The end portion of the locking pin activates the alarm when the locking pin is inserted into the locking pin housing assembly such that the alarm moves into the armed status. Any unauthorized removing or repositioning of the locking pin within the locking pin housing assembly causes the alarm to move into the alarm status. The hitch alarm detects an unauthorized removal of either the hitch member or the towed vehicle from the towing vehicle. The hitch alarm is substantially hidden from view when the drawbar is secured to the tow vehicle mount.

The preferred embodiment of the hitch alarm of the present invention involves the use of a plunger switch that detects an unauthorized removal of either the hitch member or the towed vehicle from the towing vehicle. The plunger switch is mounted through a retention surface positioned at the rear end of the receiving tube. The hitch alarm is substantially hidden from view when the drawbar is secured to the tow vehicle mount.

For a more complete understanding of the hitch locking and alarm mechanism of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and

BRIEF DESCRIPTION OF THE DRAWINGS

FIG. 4A shows the alarm in the armed status and FIG. 4B shows the alarm in the alarm status.

FIG. 5A shows the alarm in the armed status and FIG. 5B shows the alarm in the alarm status.

DETAILED DESCRIPTION OF THE PREFERRED EMBODIMENTS

Figure 1A:
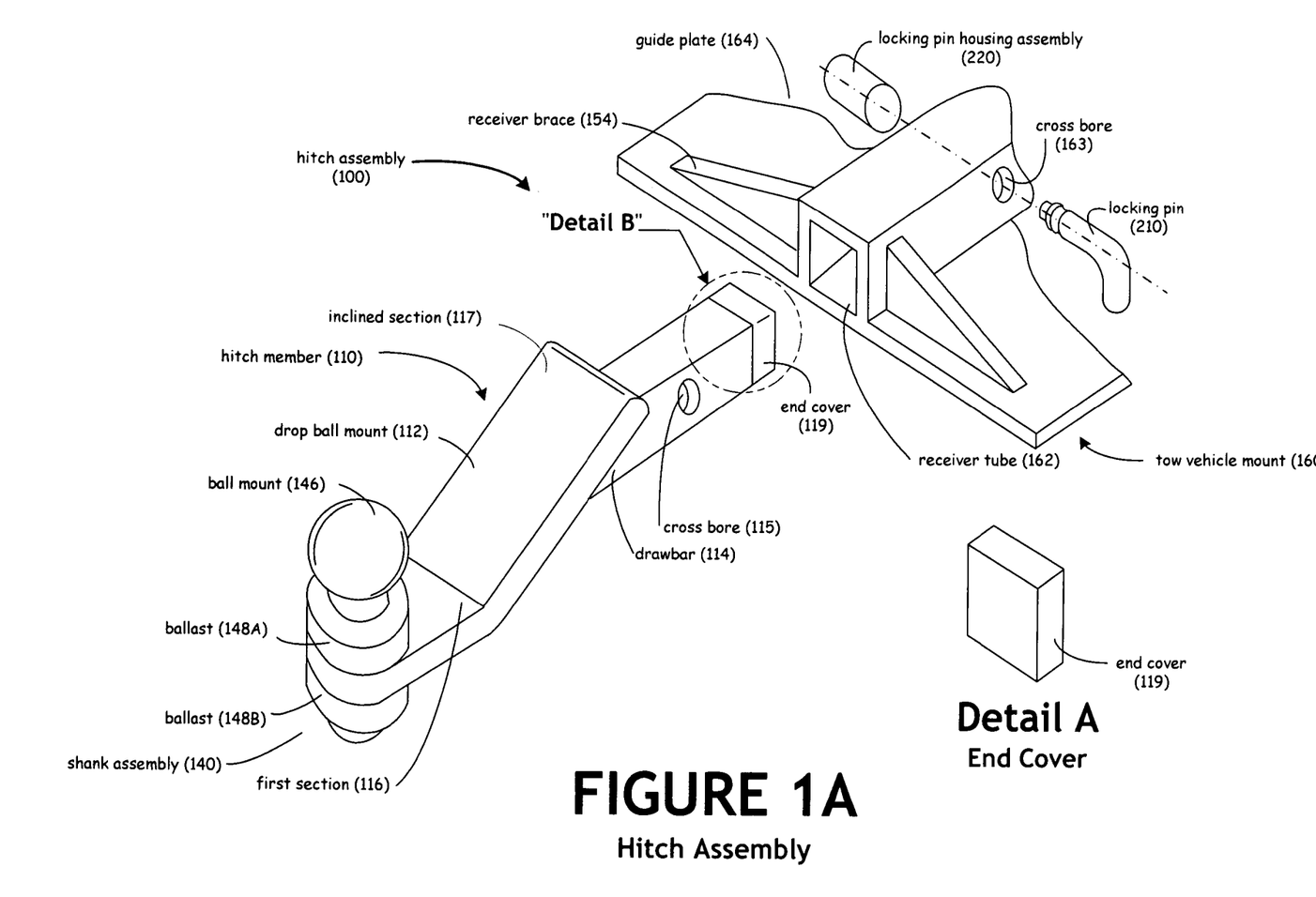
FIG. 1A discloses a preferred embodiment of the hitch locking mechanism of the present invention, the hitch locking mechanism comprising hitch member for secure attachment to a towing vehicle (not shown), a drawbar of the hitch member being insertable into a receiver tube of a tow vehicle mount positioned on a towed vehicle, the drawbar and the receiver tube each having cross bores that are alienable, and a locking pin and locking pin housing assembly being alignable through cross bores in the receiver tube of the tow vehicle mount once the drawbar has been positioned into the receiving tube.
Figure 4A:
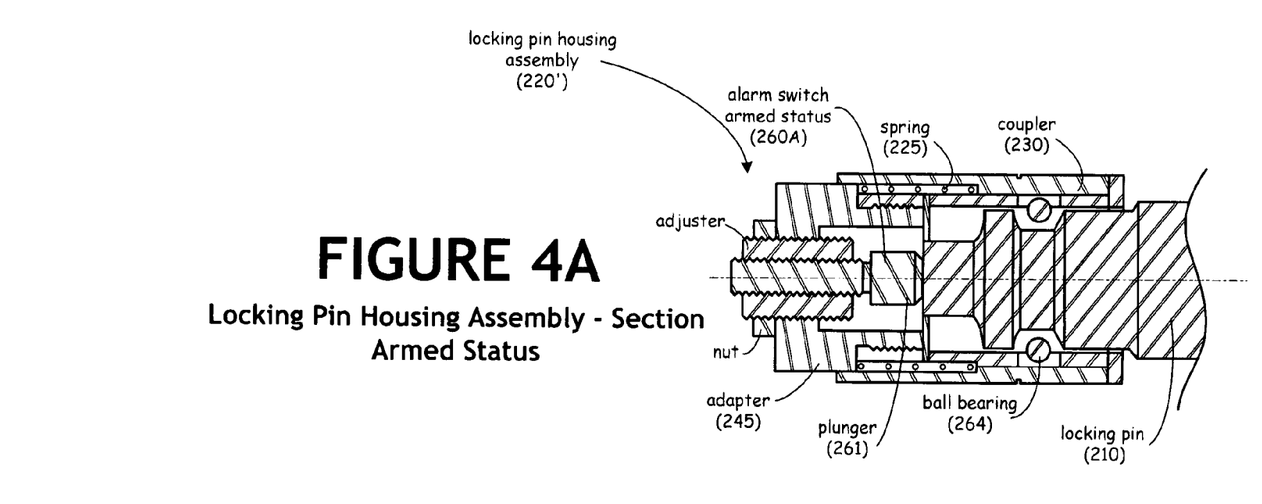
FIGS. 4A and 4B disclose section views of a second preferred embodiment of the locking pin security assembly of the present invention. The locking pin security assembly comprises the locking pin, the locking pin housing assembly and an alarm.
Figure 4B:
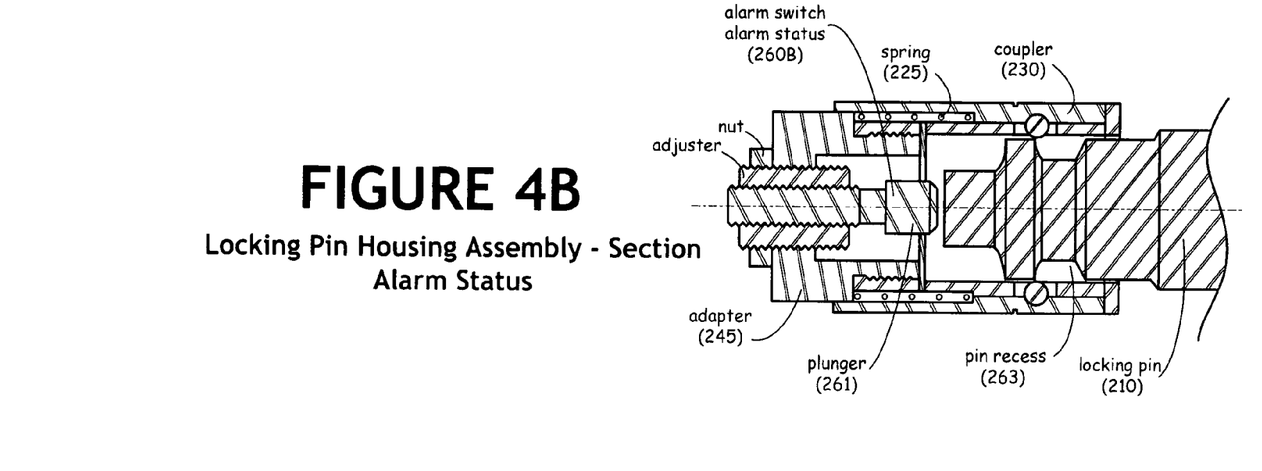
Figure 5A:
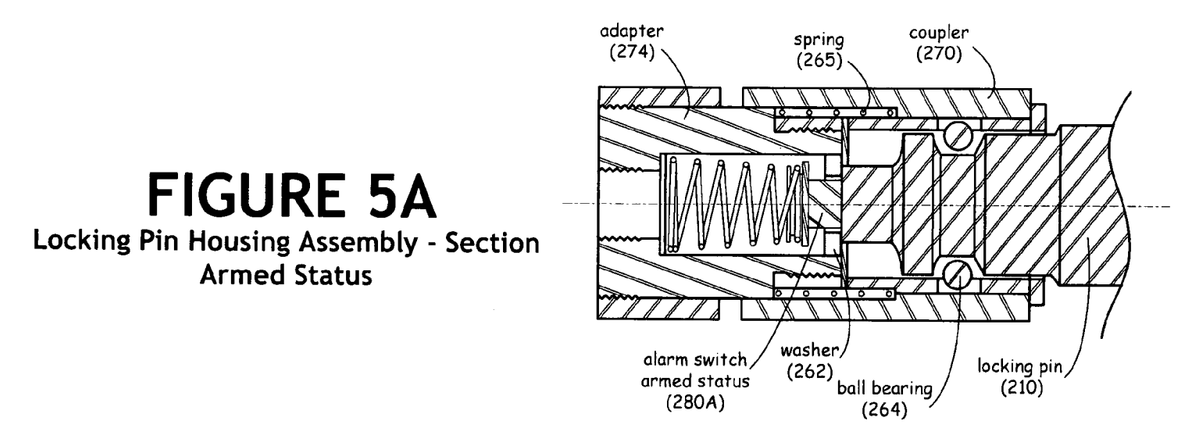
FIGS. 5A and 5B disclose section views of a third preferred embodiment of the locking pin security assembly of the present invention. The locking pin security assembly comprises the locking pin, the locking pin housing assembly and an alarm.
Figure 5B:
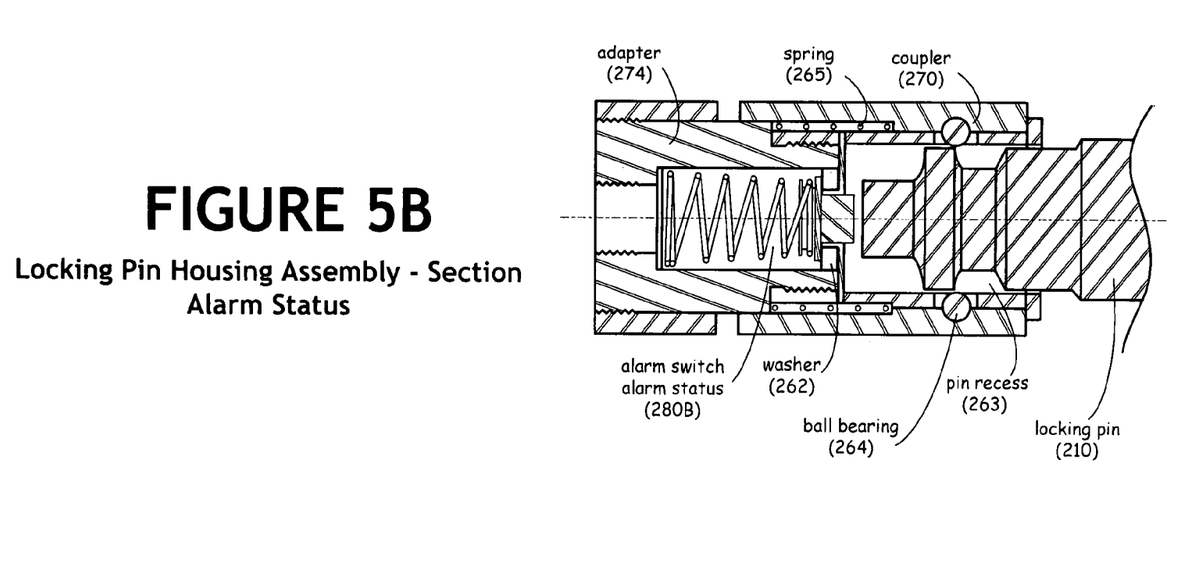

Referring now to the drawings, FIG. 1A depicts the preferred embodiment of the hitch locking and alarm mechanism of the present invention with a trailer hitch assembly. The trailer hitch assembly comprises a hitch member (110) for attachment to the towing vehicle, and a tow vehicle mount (160) for attachment to the towed vehicle. The hitch locking and alarm mechanism comprises a locking pin (210), and a locking pin housing assembly (220) with a hitch alarm. One preferred embodiment of the hitch alarm (260) is shown in FIGS. 4A and 4B and another embodiment of the hitch alarm (260A) is shown in FIGS. 5A and 5B In the preferred embodiment of the hitch locking and alarm mechanism of the present invention, the hitch member (110) comprises a shank assembly (140), a drop ball mount (112), and a drawbar (114). The drop ball mount (112) includes an opening extending therethrough for the shank assembly (140). The drawbar (114) is secured to the undersurface of the drop ball mount (112). One end of the drawbar (114) is secured to the drop ball mount (112), and a second end of the drawbar is closed (see "Detail A"). Such closure preferably comprises an end cover (119) secured to the second section of the drawbar (114) by a drawbar end cover (119) and enables cooperative engagement with the hitch alarm (260/280), as set forth below. A cross bore (115) extends through the drawbar (114).

In the preferred embodiment of the hitch locking and alarm mechanism of the present invention, the tow vehicle mount (160) comprises a receiver tube (162) secured to a vehicle guide plate (164). The drawbar (114) is inserted into and through the receiving tube (162). Additional strength between the receiver tube and guide plate is provided by a pair of receiver braces (154). Preferably, a cross bore (163) extends through the receiving tube (162). The tow vehicle mount (160) is secured to the undersurface of the towed vehicle.

Figure 3:
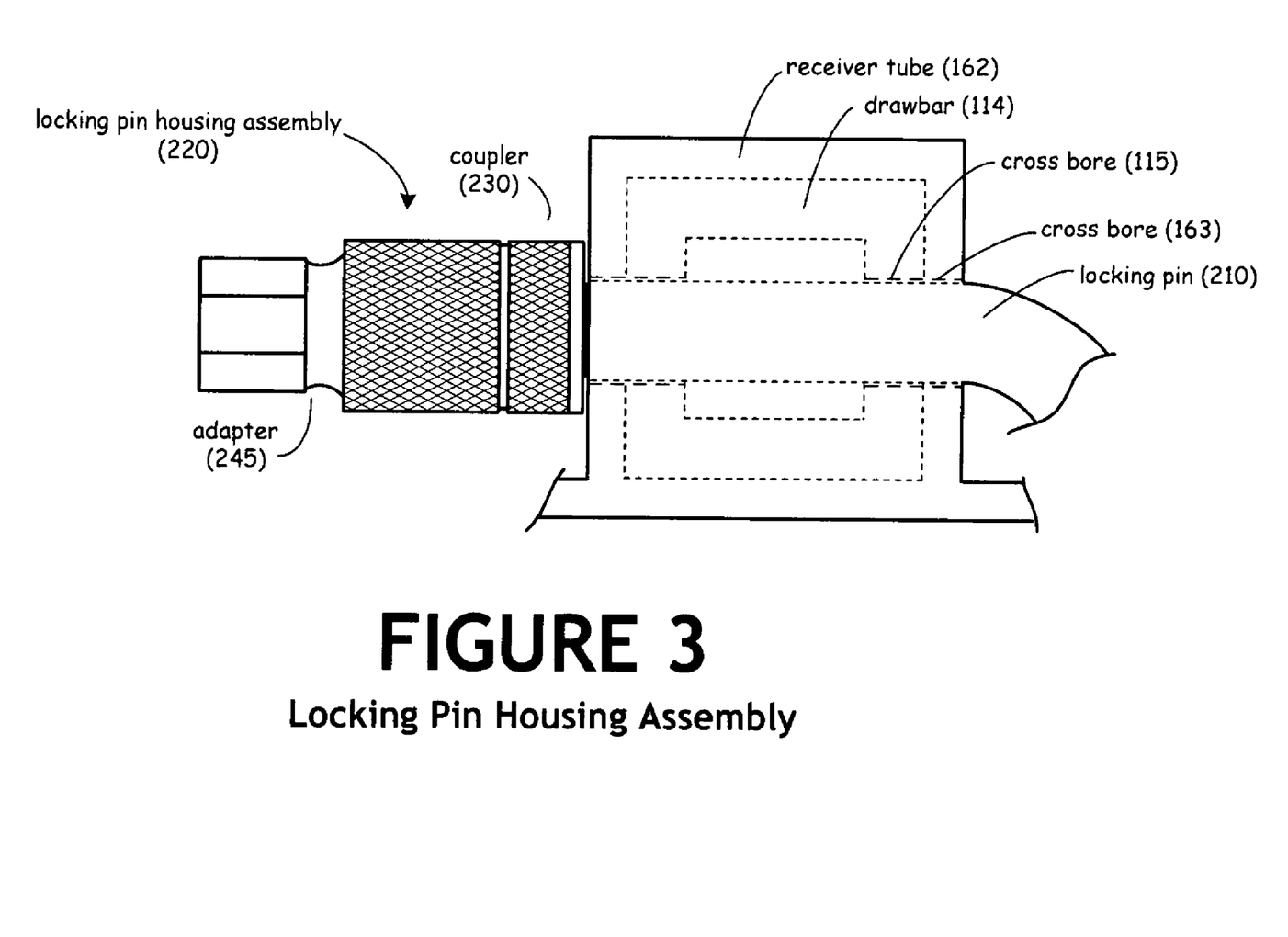
FIG. 3 discloses a first preferred embodiment of a locking pin security assembly of the present invention, the locking pin being inserted through the cross bores of the receiver tube and the drawbar and engaged with a locking pin housing assembly, the locking pin being secured to a female-threaded universal coupler.

FIG. 3 shows a more detailed depiction of the coupler as deployed in the hitch locking and alarm mechanism of the present invention. The coupler (230) is referred to as a quick coupler or as a universal coupler. The coupler (230) is preferably ⅜' size in the preferred embodiment and is commercially available from or ABAC UK Limited of Bicester Oxfordshire (UK); or Whitehorse Press of Center Conway, N.H. (US).

FIGS. 4A and 4B depict the preferred embodiment of the engagement between the locking pin (210) and the locking pin housing assembly (220') of the present invention. The end of the locking pin is machined so as to be securely retained within the jaws of the locking pin housing assembly (220'). The adapter (245) is inserted and threadedly secured into the coupler (230). A center section of the locking pin (210) is machined out to form a pin recess (263), the pin recess (263) being aligned with six ball bearings mounted about a section of the coupler (230). Once inserted into the coupler (230), the locking pin (210) is secured into position. A spring (225) internally positioned within the coupler urges the ball bearings (264) to seat in the pin recess (263) in the locking pin (210). Then, the alarm switch (260) is positioned into the adapter (245) until the forward end of the alarm switch touches the forward end of the locking pin (210).

Figure 4C:
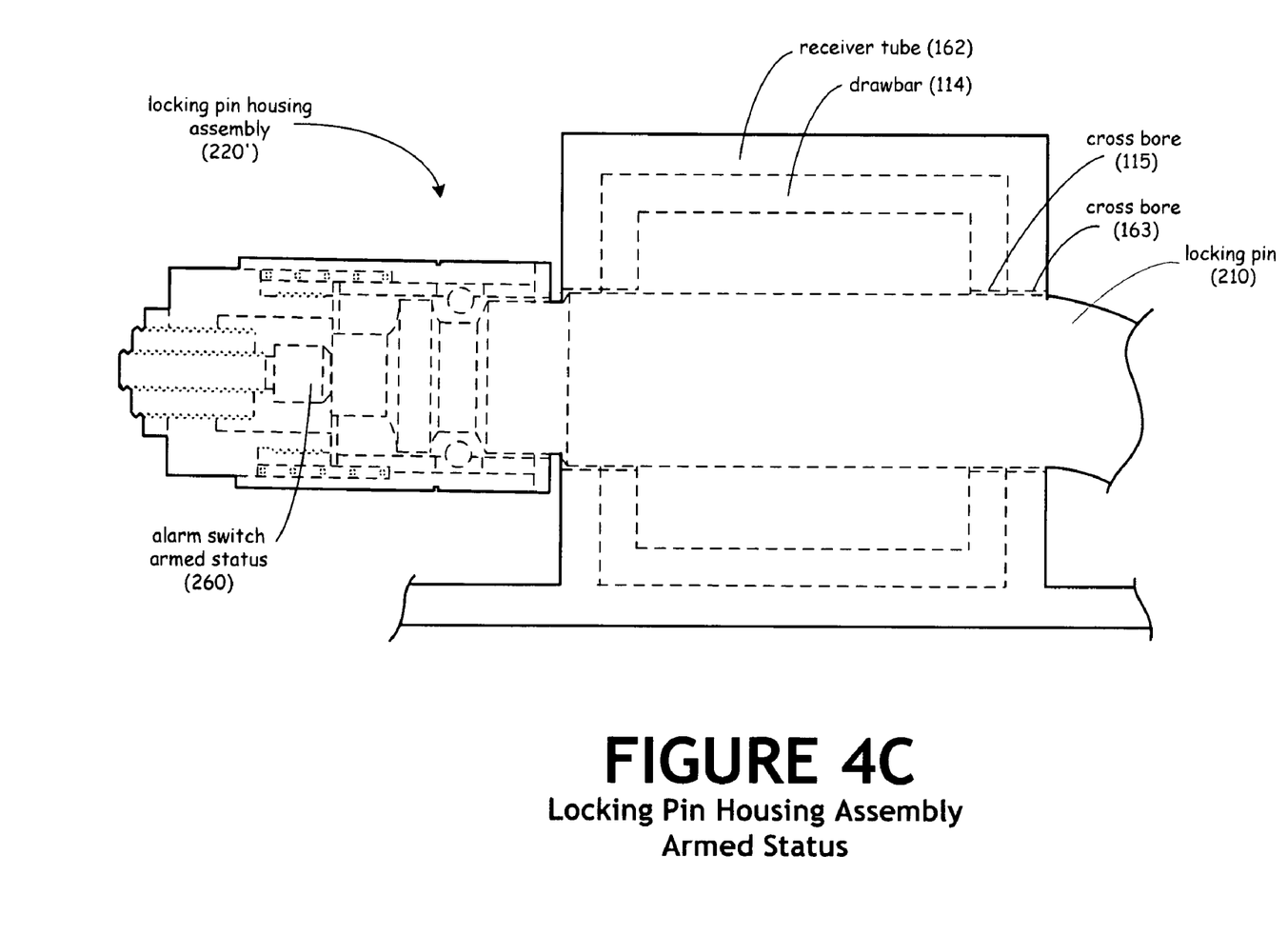
FIG. 4C shows the second preferred embodiment of the locking pin security assembly of the present invention as depicted in FIGS. 4A and 4B, the locking pin housing assembly being mounted in the drawbar which is positioned within the receiver tube of FIG. 1A.

As shown in FIG. 4C, the locking pin (210) and locking pin housing assembly (220) are alignable with each other through the cross bores (163) in the receiver tube (162) and the cross bores (115) of the drawbar (114), once the drawbar (114) has been positioned inside the receiving tube (162).

The alarm (260) is mounted in the locking pin housing assembly (220'). The end portion of the locking pin (210) moves the alarm (260) into the armed status. Any unauthorized removing or repositioning of the locking pin (210) within the locking pin housing assembly (220') causes the alarm (260) to move into the alarm status.

Figures 2A, 2B:
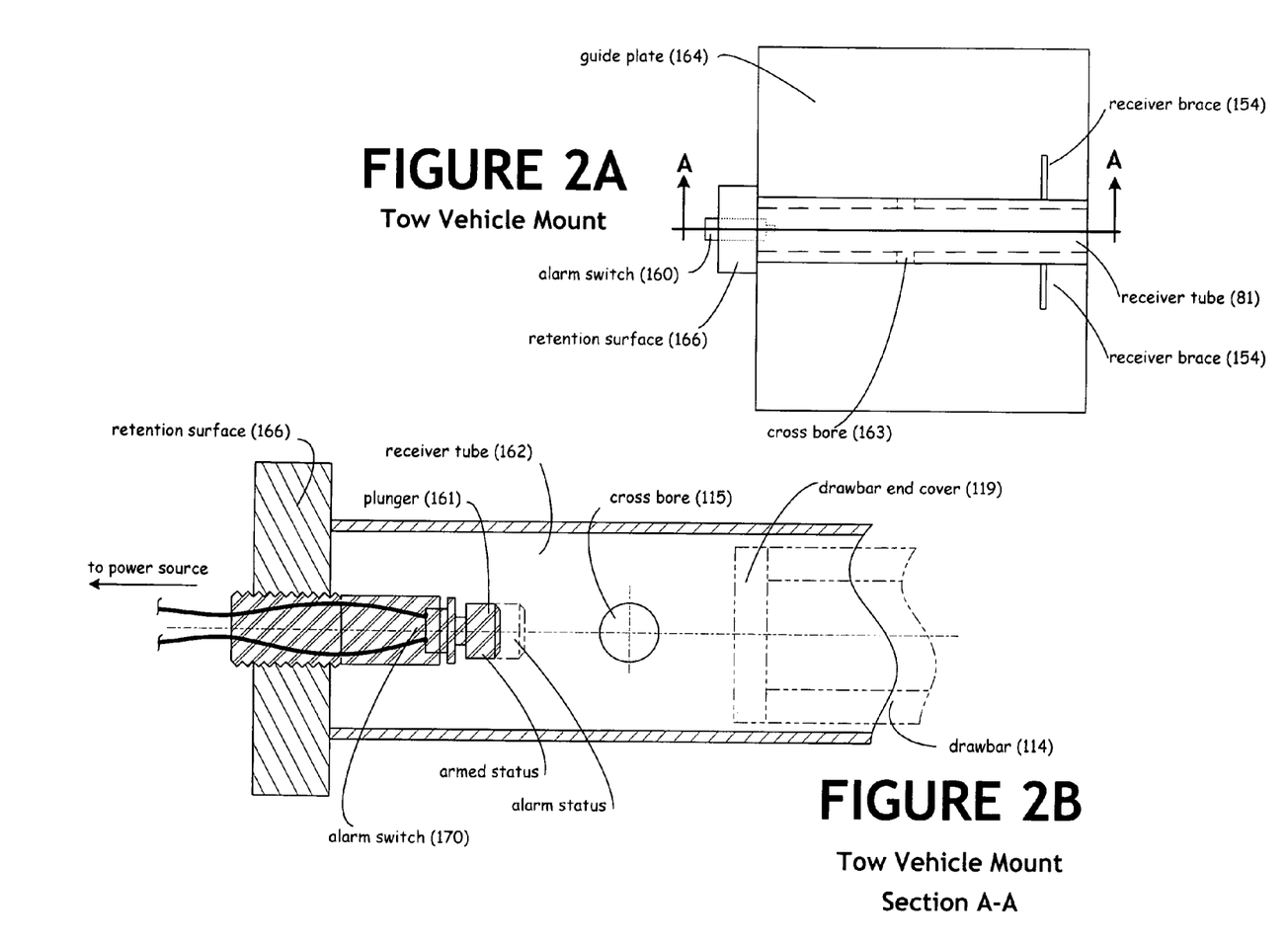
FIG. 2A discloses the preferred embodiment of the hitch locking mechanism of FIG. 1A and FIG. 1B, the hitch locking mechanism having a hitch alarm disposed inside the receiver tube and hidden from view when the drawbar is secured to the receiving tube.
FIG. 2B discloses an exploded Section A-A from FIG. 2A of a plunger switch for use in receiver tube of the hitch locking mechanism of the present invention, the plunger switch abutting the drawbar endcover, the plunger switch being in the armed status, with the plunger switch in the alarm status in phantom.

The preferred embodiment of the hitch alarm involves the use of a alarm switch that detects an unauthorized removal of either the hitch member (110) or the towed vehicle from the towing vehicle. As shown in FIG. 2B, the alarm switch (170) is mounted through a retention surface (166) positioned at the rear end of the receiving tube (166). The hitch alarm (161) is substantially hidden from view when the drawbar (114) is secured to the tow vehicle mount (160).

FIGS. 5A and 5B depict the preferred embodiment of the engagement between the locking pin (210) and the locking pin housing assembly (220') of the present invention. The end of the locking pin is machined so as to be securely retained within the jaws of the locking pin housing assembly (220"). The adapter (245) is inserted and threadedly secured into the coupler (230). A center section of the locking pin (210) is machined out to form a pin recess (263), the pin recess (263) being aligned with six ball bearings mounted about a section of the coupler (230). Once inserted into the coupler (230), the locking pin (210) is secured into position. A spring (225) internally positioned within the coupler urges the ball bearings (264) to seat in the pin recess (263) in the locking pin (210). Then, the alarm switch (260) is positioned into the adapter (245) until the forward end of the alarm switch touches the forward end of the locking pin (210).

Figure 5C:
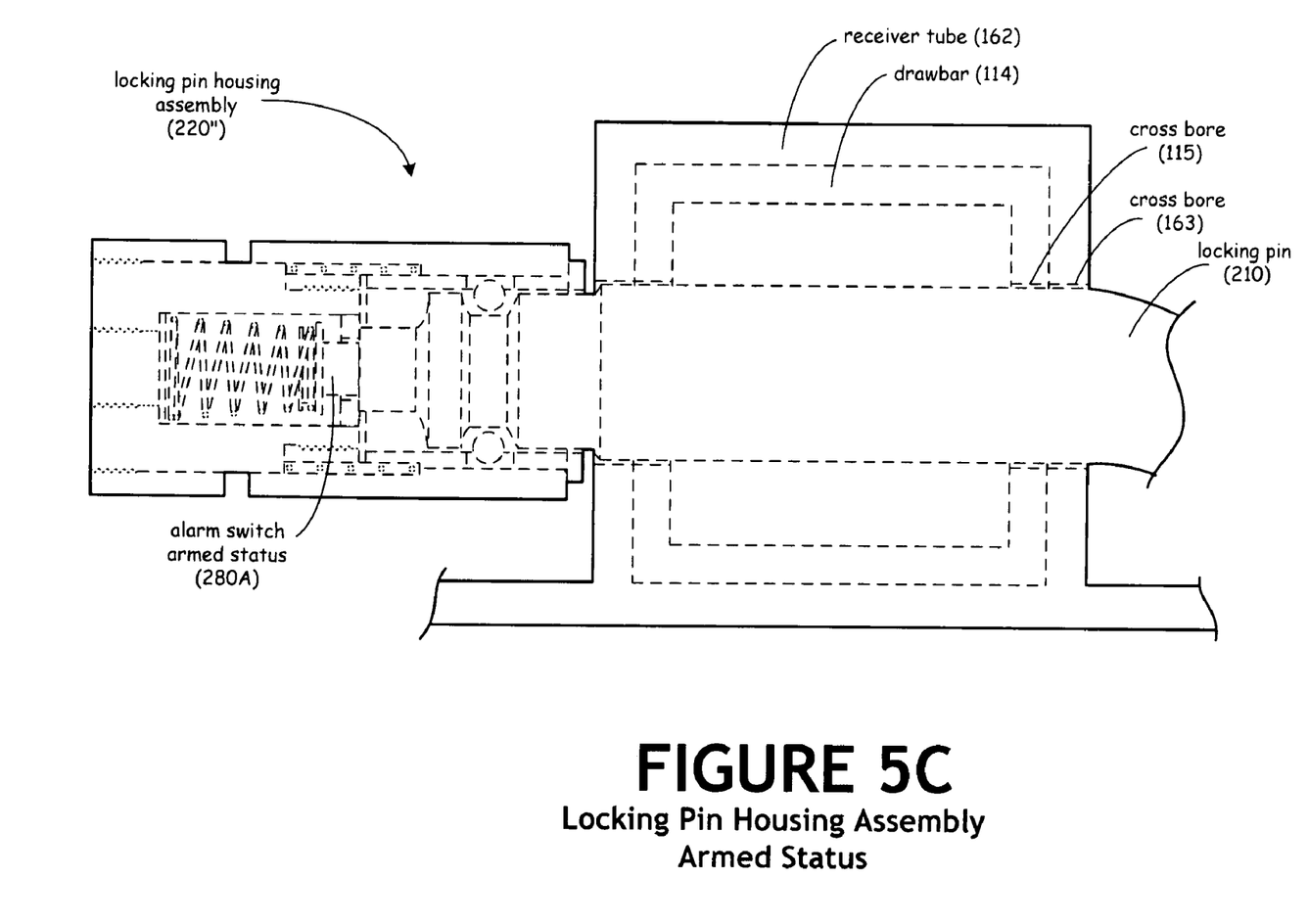
FIG. 5C shows the third preferred embodiment of the locking pin security assembly of the present invention as depicted in FIGS. 5A and 5B, the locking pin housing assembly being mounted in the drawbar which is positioned within the receiver tube of FIG. 1A.

FIG. 5C shows the alignment of the respective cross bores (163) in the receiver tube (162) and the drawbar (114), once the drawbar (114) has been positioned inside the receiving tube (162).

The alarm (280) is spring-seated through washer (262) and mounted within the locking pin housing assembly (220"). The end of the alarm rests against the locking pin (210) in the armed status. Withdrawal of the end portion of the locking pin (210) moves the alarm (280) into the alarm status.

The preferred embodiment of the hitch alarm of the present invention involves the use of a plunger switch that detects an unauthorized removal of either the hitch member or the towed vehicle from the towing vehicle. The plunger switch is mounted through a retention surface positioned at the rear end of the receiving tube. The hitch alarm (260) is substantially hidden from view when the drawbar is secured to the tow vehicle mount.

Figure 1B:
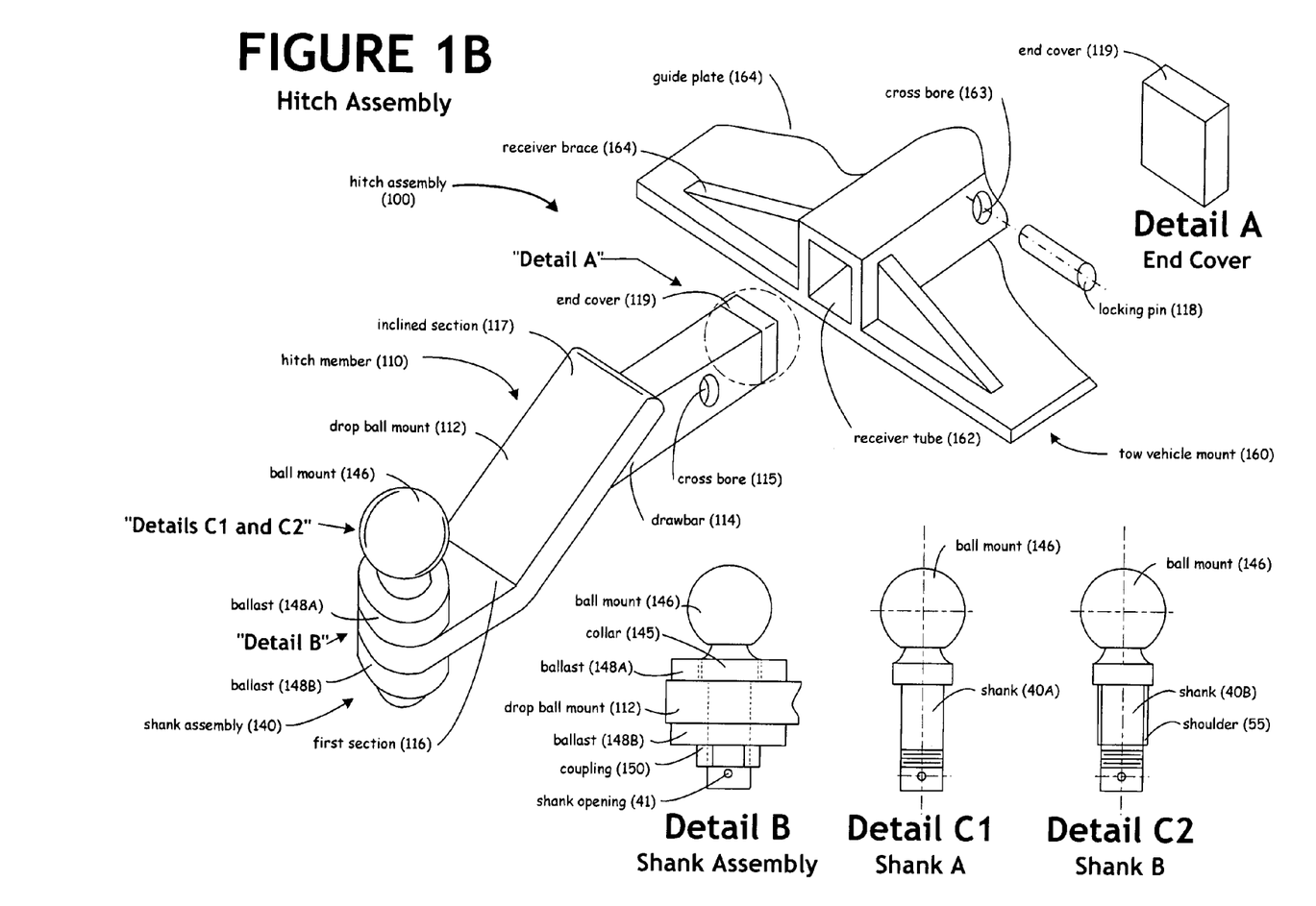
FIG. 1B discloses another preferred embodiment of the hitch locking mechanism of the present invention, the hitch locking mechanism comprising a shank assembly disposed within a drop-ball mount, the drop-ball mount being secured to a backing plate, a drawbar extending from the backside of the drop ball mount, the drawbar cooperatively engaging into a receiver tube, the receiver tube being secured to a vehicle cross member.

FIG. 1B, discloses an assembly view of the preferred embodiment of the hitch assembly of the present invention. The hitch assembly (100) comprises a hitch member (110), a shank assembly (140) for attachment to the towing vehicle, and a tow vehicle mount (160) for attachment to the towed vehicle.

The hitch member (110) comprises a drop ball mount (112), and a drawbar (114). The drop ball mount (112) has two sections. The first section (116) is preferably substantially normal to the shank assembly (140) and includes an opening extending therethrough for the shank assembly (140). The second section (117) is inclined relative to the first section (116).

The drawbar (114) is elongated, and secured to the undersurface of the second section (117). A first end of the drawbar is secured to the drop ball mount (112), and a second end of the drawbar (114) is closed. As shown in Detail A of FIG. 1B, such closure preferably comprises an end cover (119) secured to the second section of the drawbar (114). Another configuration is a one-piece construction of the second section of the drawbar (114). The closure enables cooperative engagement with a hitch alarm (150), as shown in FIGS. 2A and 2B.

The preferred embodiment of the shank assembly (140) is shown in Detail B of FIG. 1B. The shank assembly (140) includes a shank (144), a ball mount (146), an upper ballast (148A), a lower ballast (148B), and a coupling member. The shank (144), is best seen in Detail C1 of FIG. 1B. The end of the shank opposite to the ball mount, includes a shank opening for engagement with a shank locking pin. The shank (144) extends through the opening of the first section of the drop ball mount (112). The ball mount (46) preferably has a threaded engagement with one end of the shank (144).

Detail C2 of FIG. 1B discloses another preferred embodiment of the shank assembly of the present invention. The shank (40B) includes a shoulder (55) that abuts an outer surface of ballast (148B) during engagement. Ballast (148B) rides on the end of the shoulder (55), the shoulder (55) having an external diameter slightly larger than the internal diameter of the ballast (148B). The shoulder (55) serves as a spacer, such that the shank assembly is free to rotate relative to the drop ball mount (112).

It is highly desirable to use the same hitch assembly for towing vehicles of differing sizes. Accordingly, the preferred embodiment of the shank assembly (140) of the present invention is designed and configured to tow varying loads under varying road and weather conditions. The shank assembly (140) is fully compatible with several ball mounts of differing sizes and construction, the larger ball mounts being employed for heavier loads and the smaller ball mounts being used for smaller loads. Thus, the ball mounts are interchangeable and compatible with the same shank (144).

In addition, the load-bearing capacity of the hitch assembly of the present invention can be varied by use of either the upper ballast (148A) and/or the lower ballast (148B), the use of both ballasts and the larger ball mounts being employed to tow the heaviest loads. In a preferred embodiment of the hitch assembly (100) of the present invention, one ballast (148A) surrounds collar 145) of shank (144) abuts the upper surface of the drop ball mount (112) and the bail mount (146), and the second ballast abuts (148B) the undersurface of the drop ball mount (146) and the coupling member (150).

The coupling member (150) enables a secure engagement between the shank assembly (140) and the drop ball mount (112), and preferably is a threaded fastener, such as a threaded nut.

The tow vehicle mount (160) is secured to the undersurface of the towed vehicle. The tow vehicle mount (160) comprises a receiver tube (162) secured to a vehicle guide plate (164). The drawbar (114) is inserted into and through the receiving tube (162). A pair of receiver braces (164) provide additional strength between the receiver tube (162) and guide plate (164).

As best seen in FIGS. 2A and 2B, the preferred embodiment of the hitch alarm (160) of the present invention involves the use of a plunger switch, with plunger (161). The plunger switch is mounted through a retention surface (166), the retention surface (166) being secured onto the rear portion of the tow vehicle mount (160). The hitch alarm (170) detects an unauthorized removal of either the hitch member (110) or the towed vehicle from the towing vehicle. The hitch alarm (170) has an armed condition and an alarm condition. The hitch alarm (160) is substantially hidden from view when the drawbar (114) is secured to the tow vehicle mount (160). The hitch alarm (170) is in the armed condition when the towed vehicle is secured to the towing vehicle. A second embodiment of the hitch alarm (170), though not shown, involves the hitch alarm (160) mounted through the drawbar end cover (119), and cooperatively engageable with the retention surface (166) of the tow vehicle mount The trigger for the alarm unit is initially armed upon installation of the hitch locking mechanism. Thereafter, the hitch alarm (170) is placed in an alarm status.

Also, the principles of the plunger switch configuration of the present invention depicted can readily be adapted for other types of hitch designs. The plunger (162) is mounted so that the switch is armed once the hitch is secured to the towing vehicle. The switch (170) moves into an alarm condition whenever the hitch is removed from towing vehicle. The plunger switch (170) is secured to a backing plate. The plunger switch (170) is installed so that the axis of the plunger (162) is aligned with the axis of the drawbar movement within the receiver tube (162). Then, the plunger switch (170) is inched forward into the backing plate (166) until resistance is achieved—the resistance indicates the plunger (162) has met the drawbar end cover (119) and the plunger (162) is being pushed inward. Such plunger switches are commercially available from Sentrol Industrial a division of General Electric (i.e.—Model# 3010)

In another preferred embodiment of the hitch assembly (100) of the present invention, the drawbar (114) includes a cross bore (115), the cross bore (115) extending at least through one surface of said drawbar (114). The receiver tuber (162) includes a second cross bore (163). Upon insertion of the drawbar (114) into the receiver tube (162), the two cross bores become aligned in such a manner that a locking pin (118) can be inserted through the cross bores (163 and 115). The engagement of the locking pin (118) through the two cross bars (115 and 163) adds additional strength to the hitch assembly (100) of the present invention.

In the preferred embodiments of the present invention, the alarms (260 or 280) are electronically connected with the power supply of the towing vehicle, which supplies the necessary power for an audible signal through the vehicle. Alternatively, the hitch locking and alarm mechanism of the present invention can have a self-contained power supply.

Throughout this application, various patents and publications are referenced by number. The disclosures of these documents in their entireties are hereby incorporated by reference into this specification in order to more fully describe the state of the art to which this invention pertains.

It is evident that many modifications, and variations of the hitch locking and alarm mechanism of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 40A shank
41 shank opening
55 shoulder
110 hitch member
112 drop ball mount
114 drawbar
115 cross bore
116 first section
117 inclined section
119 end cover
140 shank assembly
145 collar
146 ball mount
148A ballast
148B ballast
150 tow vehicle mount
154 receiver brace
160 alarm switch
161 plunger
162 receiver tube
163 cross bore
164 guide plate
170 alarm switch
210 locking pin
220 locking pin housing assembly #1
220' locking pin housing assembly #2
220" locking pin housing assembly #3
230 coupler #1
245 adapter #1
260A alarm switch #1—armed status
260B alarm switch #1—alarm status
265 spring
264 ball bearing
262 washer
270 coupler #2
274 adapter #2
280A alarm switch #2—armed status
280B alarm switch #2—alarm status

I claim:

1. A hitch assembly comprising:
   a. a first member securely affixed to a towing vehicle, said first member having a first cross bore; and
   b. a second member securely affixed to a towed vehicle, said second member being engageable with said first member, said second member having a second cross bore, said first and second cross bores being alignable with each other when said first and second members are engaged with each other;
   whereby a locking pin is insertable through said first and second cross bores, a locking pin housing assembly being engageable with an end portion of said locking pin, said locking pin housing assembly including an alarm disposed therewithin, said alarm having an armed status and an alarm status; and
   whereby said end portion of said locking pin activates said alarm during engagement with the locking pin housing assembly such that the alarm moves into the armed status, the end of the locking pin touching said alarm when said alarm is in the armed status; and
   whereby a repositioning of said locking pin within said locking pin housing assembly causes said alarm to move into the alarm status.

2. The hitch assembly of claim 1, wherein the alarm is substantially hidden from view when said first member and said second member are securely affixed together.

3. The hitch assembly of claim 1, wherein said alarm is initially armed upon installation of said locking pin into said locking pin housing assembly.

4. A locking pin assembly for a trailer hitch, said locking pin assembly comprising:
   a. a locking pin being insertable through a first cross bore, said first bore being disposed in a first member securely affixed to a towing vehicle, said locking pin being insertable through a second cross bore, said second cross bore being disposed in a second member, said second member being mountable onto a towed vehicle, said second member being retained relative to said first member; and b. a locking pin housing assembly being engageable with an end portion of said locking pin, said locking pin housing assembly including an alarm disposed therewithin, said alarm having an armed status and an alarm status;

whereby said end portion of said locking pin activates said alarm during engagement with the locking pin housing assembly such that the alarm moves into the armed status; and whereby a repositioning of said locking pin within said locking pin housing assembly causes said alarm to move into the alarm status; and whereby said alarm is initially armed upon installation of said locking pin into said locking pin housing assembly.

5. The locking pin assembly of claim 4, wherein the alarm is substantially hidden from view when said first member and said second member are securely affixed together.

6. The locking pin assembly of claim 4, wherein the end of the locking pin touches the alarm when the alarm is in the armed status.

7. A hitch assembly comprising:
a. a hitch member securely affixed to a towing vehicle, said hitch member having a drawbar, said drawbar having a first cross bore; and
b. a tow vehicle mount securely affixed to a towed vehicle, said hitch member being engageable within a receiver tube positioned within the tow vehicle mount, said tow vehicle mount having a second cross bore, said first and second cross bores being alignable with each other when said drawbar is inserted into the receiver tube;

whereby a locking pin is insertable through said first and second cross bores, a locking pin housing assembly being engageable with an end portion of said locking pin, said locking pin housing assembly including an alarm disposed therewithin, said alarm having an armed status and an alarm status; and whereby said end portion of said locking pin activates said alarm when said locking pin is inserted into said locking pin housing assembly such that the alarm moves into the armed status; and whereby a repositioning of said locking pin within said locking pin housing assembly causes said alarm to move into the alarm status; and whereby said alarm is initially armed upon installation of said locking pin into said locking pin housing assembly.

8. The hitch assembly of claim 7, wherein the alarm is substantially hidden from view when said first member and said second member are securely affixed together.

9. The hitch assembly of claim 7, wherein the end of the locking pin touches the alarm when the alarm is in the armed status.

\* \* \* \* \*